United States Patent [19]

Davis

[11] Patent Number: 5,142,732
[45] Date of Patent: Sep. 1, 1992

[54] BULK SEPARATOR FOR INDUSTRIAL VACUUM MACHINE

[76] Inventor: Henry J. Davis, c/o A-D Machinery Sales Co., 1025 E. Oak St., Stockton, Calif. 95205

[21] Appl. No.: 589,991

[22] Filed: Sep. 28, 1990

[51] Int. Cl.⁵ .................................................. A47L 5/38
[52] U.S. Cl. .................................... 15/352; 15/340.1; 15/347; 55/356; 55/358; 55/430
[58] Field of Search ............... 15/340.1, 347, 352; 55/356, 358, 429, 430, 432

[56] References Cited

U.S. PATENT DOCUMENTS

| | | | |
|---|---|---|---|
| 2,703,733 | 3/1955 | Stueven | 55/356 X |
| 3,150,404 | 9/1964 | Johnson | 15/339 |
| 3,486,309 | 12/1969 | Wild | 55/432 X |
| 4,121,915 | 10/1978 | Anderson | 55/356 X |
| 4,226,000 | 10/1980 | Tribolet | 15/353 X |
| 4,574,420 | 3/1986 | Dupre | 15/340.1 X |
| 4,655,806 | 4/1987 | Bowersox | 55/432 X |

Primary Examiner—Chris K. Moore
Attorney, Agent, or Firm—Julian Caplan

[57] ABSTRACT

An attachment for an industrial vacuum machine is installed in the vacuum hose line and preferably supported by a boom on such machine. The attachment separates bulky items from finer materials passing through the hose. The separator includes a vacuum-tight casing containing baffles, a downward sloping bottom and a rotary vacuum air-tight valve which may be rotated to discharge bulk material into an underlying bin, truck or car without rehandling. Materials enter the separator chamber through a hose discharging into one side and exit through a second hose leading to the vacuum machine.

6 Claims, 2 Drawing Sheets

BULK SEPARATOR FOR INDUSTRIAL VACUUM MACHINE

BACKGROUND OF THE INVENTION

This invention relates to a new and improved bulk separator attachment for industrial vacuum machines. Such machines separate industrial waste and dust drawn through an elongated hose which leads to the source of such material including excavations, highway spills, buildings, railroad cars and other locations where large quantities of dirt, debris and spilled materials occur. The present invention is installed in such hose to remove the most bulky items and is so positioned that it may be emptied into a bin or other receptacle independent of the removal of debris from the vacuum machine itself.

DESCRIPTION OF RELATED ART

Typical vacuum machines are shown in U.S. Pat. Nos. 3,651,621 and 4,150,913. It will be understood that there are many other such machines performing similar functions. "Cyclone" type separators are widely used. Such separators remove bulky materials from a air stream by centrifugal force and by the contact of the bulky materials with the walls of the separator.

The present invention differs from conventional cyclone separators in that it is dedicated to a specific purpose, namely, the removal of heavy bulk materials passing along a vacuum hose in such a way that the materials may be discharged into a bin or other dump without materially reducing the vacuum in the line and without making it necessary to stop the vacuum machine.

SUMMARY OF THE INVENTION

An industrial vacuum machine is conventionally mounted on the chassis of a vehicle. It contains various baffles and filters which remove dust and other debris of various sizes, classifying the material according to size. The material is drawn into the machine through a long hose, the remote end of the hose being used to suck up from the site various sizes and densities of debris.

The separator of the present invention is installed in such a hose and separates the bulkiest material. A discharge valve on the bottom of the separator is constructed so that material may be discharged from time to time without materially interfering with the vacuum in the hose. Thus, the separator has an upper chamber preferably provided with two or more baffles so that the air and debris is directed in a swirling pattern which causes the largest pieces to contact the walls of the chamber and fall out of the air stream. The bottom of the separator slopes downward inward. The discharge valve is installed immediately below the bottom of the separator chamber and preferably as a cylindrical housing in which a shaft is rotatably mounted. Vanes extend out from the shaft to contact the interior of the housing. A hydraulic motor or other drive means turns the shaft. Debris between vanes is brought around to the open bottom of the valve and is discharged into a bin, dump truck or other convenient disposal means.

DESCRIPTION OF THE PREFERRED EMBODIMENTS

Figure 1:
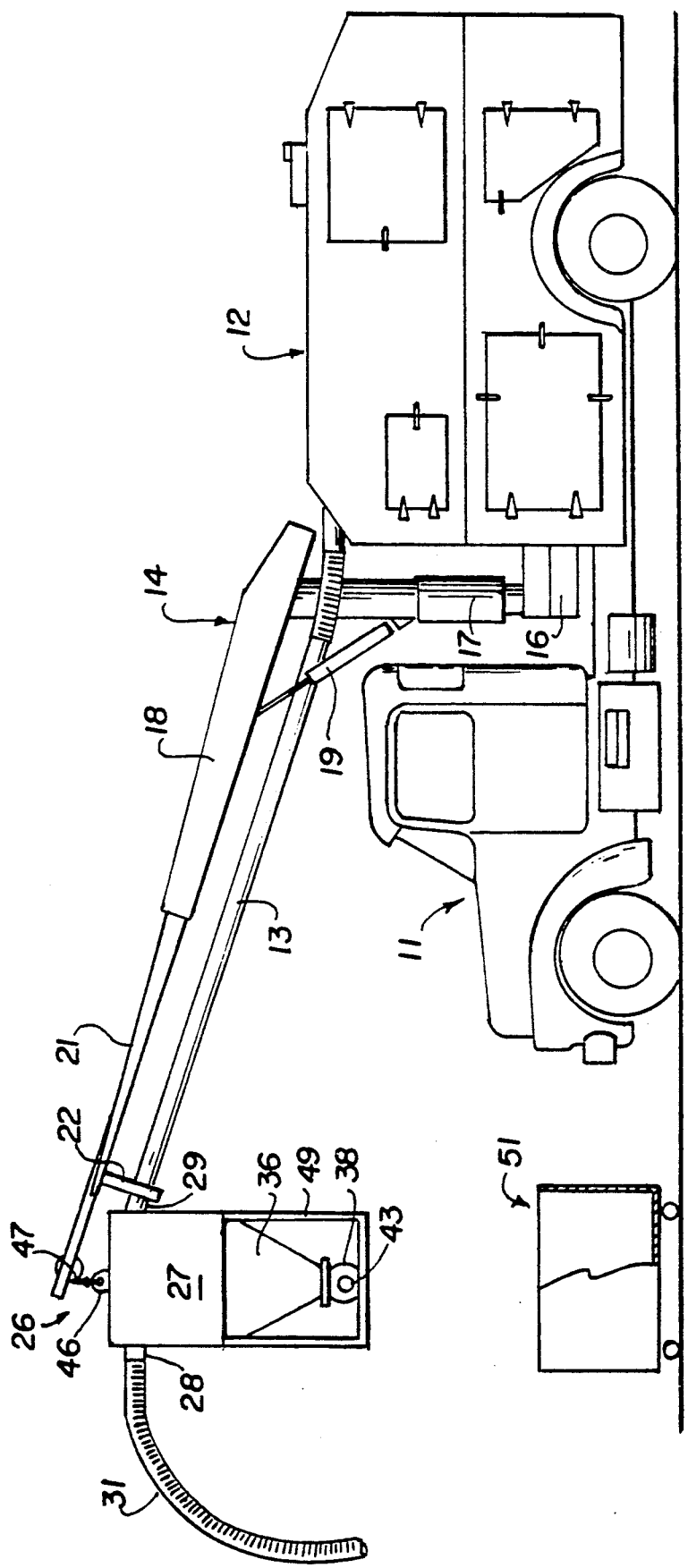
FIG. 1 is a side elevational view of a typical use of the separator of the present invention.
Figure 2:
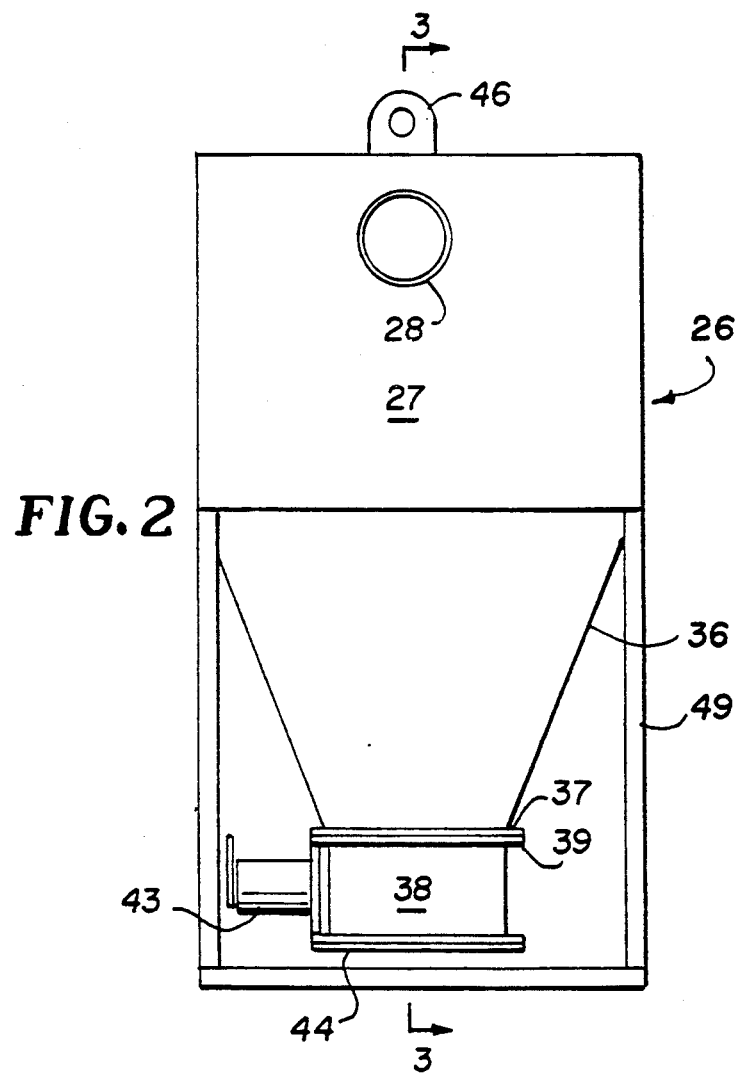
FIG. 2 is an enlarged side elevational view thereof.

A vehicle 11 supports an industrial vacuum machine of the type shown in U.S. Pat. Nos. 3,651,621 and 4,150,913 or other equivalent machines. From machine 12 extends an elongated flexible intake hose 13. Vehicle 11 may support a boom 14. Such boom may have a base 16 from which extends an oscillatable mast 17. Pivoted to the upper end of mast 17 is a boom arm 18. Cylinder 19 controls the angle of arm 18 relative to mast 17. Boom 18 has an extension arm 21 which is extendable in such manner as to direct the hose in the direction of the source of waste material. Accordingly, a loop 22 may be attached to the extension 21 to support the hose 13 well above the ground.

Separator 26 is connected to the outer end of the inner hose section 13. Separator 26 has an upper casing 27 which is preferably rectangular in cross section. On one side is an inlet 28 and on the other side an outlet 29. Hose 13 is connected to outlet 29 and second hose length 31 to the inlet 28.

In the interior of separator 26 there is preferably located at least one baffle 32 which extends downward inward from above the inlet 28 to direct air flow downward. Similarly, baffle 34 extends upward inward from below the outlet 29 to insure that air passes out through the outlet 29 only after it has swirled around the interior of the upper casing 27.

The bottom 36 of the separator 26 is preferably downward converging having an apertured rectangular bottom flange 37. Below bottom 36 is valve housing 38 which has an upper flange 39 which mates with and is secured to the flange 37. Housing 38 is cylindrical in shape having an upper opening communicating with bottom 36. Within housing 38 is a horizontal shaft 41 from which extends vanes 42, the outer edges of which engage the interior of the housing 38. Shaft 41 may be turned by an external hydraulic motor 43 or other means. As the shaft 41 turns, the vanes 42 carry debris from the bottom 36 around the casing 38 and discharge the same through bottom opening 44. It will thus be seen that the vacuum within the separator 26 is not materially reduced even though the bulk material is continuously discharged through the valve.

At the top of separator 26 there may be installed a lift eye 46 by which the separator may be transported and preferably a frame 49 surrounds the bottom of the separator so that it may be lowered to the ground or to a bin 51 without damaging the valve 38. In a preferred form shown in FIG. 1, lift eye 46 is attached by a chain or wire or other convenient means to the outer end of the boom extension 21. Because the separator 26 is relatively light in weight, however, it may be supported by any means which supports the hoses 13 and 31.

Figure 3:
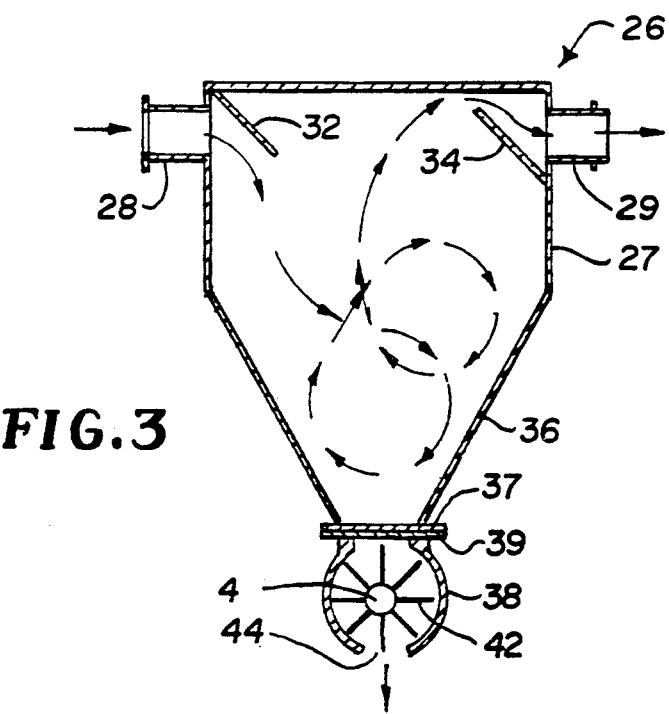
FIG. 3 is a somewhat schematic sectional view through the structure of FIG. 2 taken substantially along the line 3—3 of FIG. 2.

In use, the vehicle 11 and boom 14 are driven and extended at such position that the outer end of the hose 31 is directed to the source of debris. The machine 12 draws a vacuum within the hose 31 which sucks up the material. When the larger material enters the separator 26 through the opening 28 it is diverted downwardly in a swirling pattern shown in FIG. 3 by the baffle 32. As the larger materials contact the walls of the upper casings 27 and bottom 36 they are separated out of the air stream and fall to the bottom. Preferably, the separator 26 is positioned over a bin 51, a dump truck, rail car or other suitable receptacle. As motor 43 turns the vanes 42, material on the bottom 36 is conveyed around the interior of the housing 38 and discharged through the bottom opening 44 so that it falls by gravity into the bin 51. Smaller material passes out through the outlet 29 and hose 13 into the vacuum machine 12 where all of the dirt and other materials are separated out before the air is discharged to the atmosphere.

What is claimed is:

1. A bulk separator comprising a vacuum-tight casing having an inlet, an outlet, a casing bottom, a valve in said bottom, said valve being vacuum-tight and having means to discharge bulk material separated in said casing out of said casing, an industrial vacuum machine having a machine inlet, a first hose between said machine inlet and said separator outlet; a second hose extending from said separator inlet, a boom on said vacuum machine and means on said boom to support said first hose, and a lift eye on said separator and means connecting said lift eye and said boom to support said separator.

2. A combination according to claim 1 in which said valve has a cylindrical housing having a top communicating with said casing bottom and an open valve bottom for discharge, a rotatable shaft, vanes on said shaft contacting the inside of said housing and means for rotating said shaft, whereby bulk material in the casing bottom is received between vanes, transmitted around one side of said housing and discharged through said valve bottom without substantially reducing the vacuum in said casing.

3. A combination according to claim 1 which further comprises a baffle in said casing extending from a location above said separator inlet downward-inward at an angle across said separator inlet.

4. A combination according to claim 1 which further comprises a baffle in said casing extending from a location below said separator outlet upward-inward at an angle across said separator outlet.

5. The combination of claim 1 in which said boom is rotatable to move said separator so that said means to discharge bulk is positioned over a bin.

6. In combination, an industrial vacuum machine and a separator according to claim 1, which further comprises a source of vacuum for said vacuum machine, said separator casing being shaped to cause air and waste material drawn through said second hose entering said separation casing inlet to swirl around the inside of said casing to separate heavy portions of said waste material from said air solely by swirling action.

* * * * *